United States Patent [19]

Nipper et al.

[11] Patent Number: 4,813,223

[45] Date of Patent: Mar. 21, 1989

[54] APPARATUS FOR FORMING AN SZ CABLE AND METHOD OF USE

[75] Inventors: James H. Nipper, Lisle; Grigory Men, Naperville; Douglas K. Lindstrand, Elburn, all of Ill.

[73] Assignee: Cooper Industries, Inc., Houston, Tex.

[21] Appl. No.: 178,203

[22] Filed: Apr. 6, 1988

[51] Int. Cl.[4] ...................... H01B 13/02; H01B 13/22; G02B 6/04

[52] U.S. Cl. ........................................... 57/294; 57/6; 57/13; 57/293; 57/314

[58] Field of Search ............... 57/3, 6, 7, 9, 13, 16–18, 57/293, 294, 204, 205, 311, 314

[56] References Cited

U.S. PATENT DOCUMENTS

| | | | |
|---|---|---|---|
| 3,187,495 | 6/1965 | Christian | 57/293 |
| 3,645,079 | 2/1972 | Stoebener | 57/294 |
| 3,659,408 | 5/1972 | Burr | 57/294 |
| 3,884,024 | 5/1975 | Oestreich et al. | 57/294 |
| 3,910,022 | 10/1975 | Reed | 57/59 X |
| 4,207,928 | 6/1980 | Pershin et al. | 57/294 X |
| 4,214,430 | 7/1980 | Vogelsberg et al. | 57/6 |
| 4,309,869 | 1/1982 | Boyce | 57/293 |
| 4,325,214 | 4/1982 | Zuber | 57/293 |
| 4,359,857 | 11/1982 | Oestreich | 57/18 |
| 4,359,860 | 11/1982 | Schleese et al. | 57/293 |
| 4,414,802 | 11/1983 | Garner et al. | 57/293 |
| 4,426,839 | 1/1984 | Garner et al. | 57/293 |
| 4,429,520 | 2/1984 | Garner et al. | 57/293 |
| 4,429,521 | 2/1984 | Oestreich | 57/294 |
| 4,432,199 | 2/1984 | Dzyck et al. | 57/294 |
| 4,434,610 | 3/1984 | Oestreich | 57/294 |
| 4,467,596 | 8/1984 | Feese et al. | 57/293 |
| 4,493,182 | 1/1985 | Vogelsberg | 57/293 |
| 4,528,810 | 7/1985 | Vogelsberg | 57/293 X |
| 4,586,327 | 5/1986 | Oestreich | 57/294 |
| 4,590,755 | 5/1986 | Garner | 57/293 |
| 4,615,168 | 10/1986 | Oestreich | 57/293 X |

*Primary Examiner*—John Petrakes

*Attorney, Agent, or Firm*—Fitch, Even, Tabin & Flannery

[57] ABSTRACT

Apparatus for forming an SZ cable. The apparatus includes supply spools for providing a number of conductors to be formed into the cable, positioned at the upstream end of the apparatus, and a take-up reel for advancing the conductors downstream and for taking up the completed cable. A fixed guide ring having openings for passage of the conductors is located downstream of the supply means, and a rotatable guide ring is positioned downstream of the fixed guide ring. A first motor is provided for rotating the downstream guide ring. The apparatus further includes an accumulator tube having an outside surface for receiving turns of the conductors, with the tube being movable back and forth relative to the direction of travel of the conductors. An intermediate guide ring is carried by the tube adjacent its downstream end. The apparatus also includes a second motor for rotating the intermediate guide ring and the tube with the tube being movable between a downstream position and an upstream position. Finally, the apparatus includes equipment for biasing the accumulator tube towards its upstream position. A method of forming an SZ cable using the apparatus is also disclosed.

13 Claims, 3 Drawing Sheets

APPARATUS FOR FORMING AN SZ CABLE AND METHOD OF USE

This invention relates to apparatus for forming a cable and, more specifically, to apparatus for forming a cable having an SZ twist.

BACKGROUND OF THE INVENTION

In the formation of a cable from a number of conductors, it is beneficial to twist the conductors about the axis of the cable. Besides maintaining the conductors assembled, this increases the flexibility of the cable. Additionally, in the case of electrical conductors, the twisting reduces cross talk among the various circuits in which the conductors are employed.

One method of twisting the conductors involves continuously twisting the conductors in the same direction as the cable advances. This method requires the use of a planetary cabler which continuously rotates the conductor supply spools about the direction of travel of the cable. Such planetary cablers are large, complex and very expensive. Additionally, they must be stopped periodically to replace the exhausted conductor spools.

In an SZ cable, the conductors are twisted in a clockwise direction for a number of turns, and then the conductors are twisted in a counterclockwise direction for a like number of turns before again reversing the twist direction. While an SZ twist does result in spaced transition positions (where the twist direction is changed) and does require that a wrap or outer jacket be provided to hold the conductors from untwisting, an SZ twist can be fabricated with relatively simple equipment. Conventional SZ cablers employ an accumulator tube, for accumulating turns of the conductors on its outside surface, which rotates in one direction and then reverses after a predetermined number of turns. However, relatively few turns can be accumulated on the tube before the direction must be reversed. Otherwise the frictional engagement between the conductors and the tube becomes too great, resulting in damage to the conductors.

One proposed SZ cabler includes an accumulator tube which is reciprocated in the direction of travel of the cable by means of a reversible motor. A second reversible motor is provided which rotates the accumulator tube, an intermediate guide ring and a downstream guide ring. This apparatus requires that the number of turns of the conductor on the tube be counted and that, upon a predetermined number of turns being achieved, the direction of rotation is reversed. For further information regarding the structure and operation of this relatively complex SZ cabler, reference may be made to U.S. Pat. No. 4,586,327.

SUMMARY OF THE INVENTION

Among the several aspects and features of the present invention may be noted the provision of an improved SZ cabler. In the cabler of the present invention there is no need to count turns of conductors on the accumulator tube because the cabler is self-adjusting in that after reaching a maximum number of turns, determined by axial tube position, the tube rotates in the opposite direction to remove turns. This opposite rotation continues until biasing means overcomes the force occasioned by the friction of the advancing conductors on the tube, resulting in the tube being moved upstream. This direction of rotation also continues until, with the tube in its upstream position, turns again accumulate of the tube until the frictional forces overcome the bias thereby moving the tube downstream. Again upon the tube reaching the predetermined axial position, the tube rotation reverses to take turns off the tube to again initiate the cycle apparatus of the present of operation. In the invention, the motor rotating a downstream guide ring and the motor rotating an intermediate guide ring, carried at the downstream end of the accumulator tube, can be operated at different speeds thereby permitting the cabler to have an increased line speed. Furthermore, the provision of a slip clutch between the intermediate guide ring and the tube decreases the inertia that must initially be overcome to reverse direction of rotation resulting in a shorter transition portion between adjacent S and Z twisted portions in the completed cable. The SZ cabler of the present invention has long service life, is reliable in use, and is relatively easy and economical to manufacture. Other aspects and features of the present invention will be, in part, apparent and, in part, pointed out specifically in the following specification and in the accompanying drawings.

Briefly, the apparatus of the present invention includes a supply means for providing the conductors positioned at the upstream end of the apparatus, and also includes take-up means for advancing the conductors downstream and positioned at the downstream end of the apparatus. A fixed upstream guide ring, a rotatable downstream guide ring and an intermediate guide ring (positioned between the other two guide rings) all have openings for passage of the conductors. A first motor is provided for rotating the downstream guide ring and an accumulator tube has an outside surface for accumulating turns of the conductors with the tube being reciprocal relative to the direction of travel of the conductors. The intermediate guide ring is carried by the tube adjacent its downstream end. A second motor is provided for rotating the intermediate guide ring and the tube with the tube being movable between a downstream position wherein the intermediate ring is positioned adjacent the rotatable guide ring and an upstream position wherein the intermediate ring is located closer to the fixed guide ring. The apparatus also includes means for biasing the accumulator tube toward its upstream position.

As a method of forming a number of conductors in a cable having an SZ twist, the invention includes the following steps:

(a) The conductors are advanced from an upstream supply to a downstream take-up reel;

(b) The conductors are passed through openings in the various guide rings with the intermediate guide ring held adjacent the downstream end of an accumulator tube having an outside surface for receiving turns of the conductors;

(c) The tube is biased towards its upstream position with the biasing force being weaker than the force provided by the take-up reel for advancing the conductors;

(d) The rotatable downstream guide ring is rotated with a first motor while the intermediate guide ring is rotated with a second motor in the same direction as the direction of rotation of the first motor until the frictional forces imposed by the increasing number of turns on the tube causes the tube to advance to a predetermined position located at least halfway between the upstream location and the downstream location;

(e) The direction of rotation of both motors is reversed upon the tube reaching its predetermined location and that direction of rotation is maintained until the tube moves to its upstream position and again moves downstream to its predetermined location; and (f) The reversal of direction of both motors is continued each time the accumulator tube moves downstream to the predetermined location.

BRIEF DESCRIPTION OF THE DRAWINGS

Corresponding reference characters indicate corresponding components throughout the several views of the drawings.

DESCRIPTION OF THE PREFERRED EMBODIMENT

Figure 1:
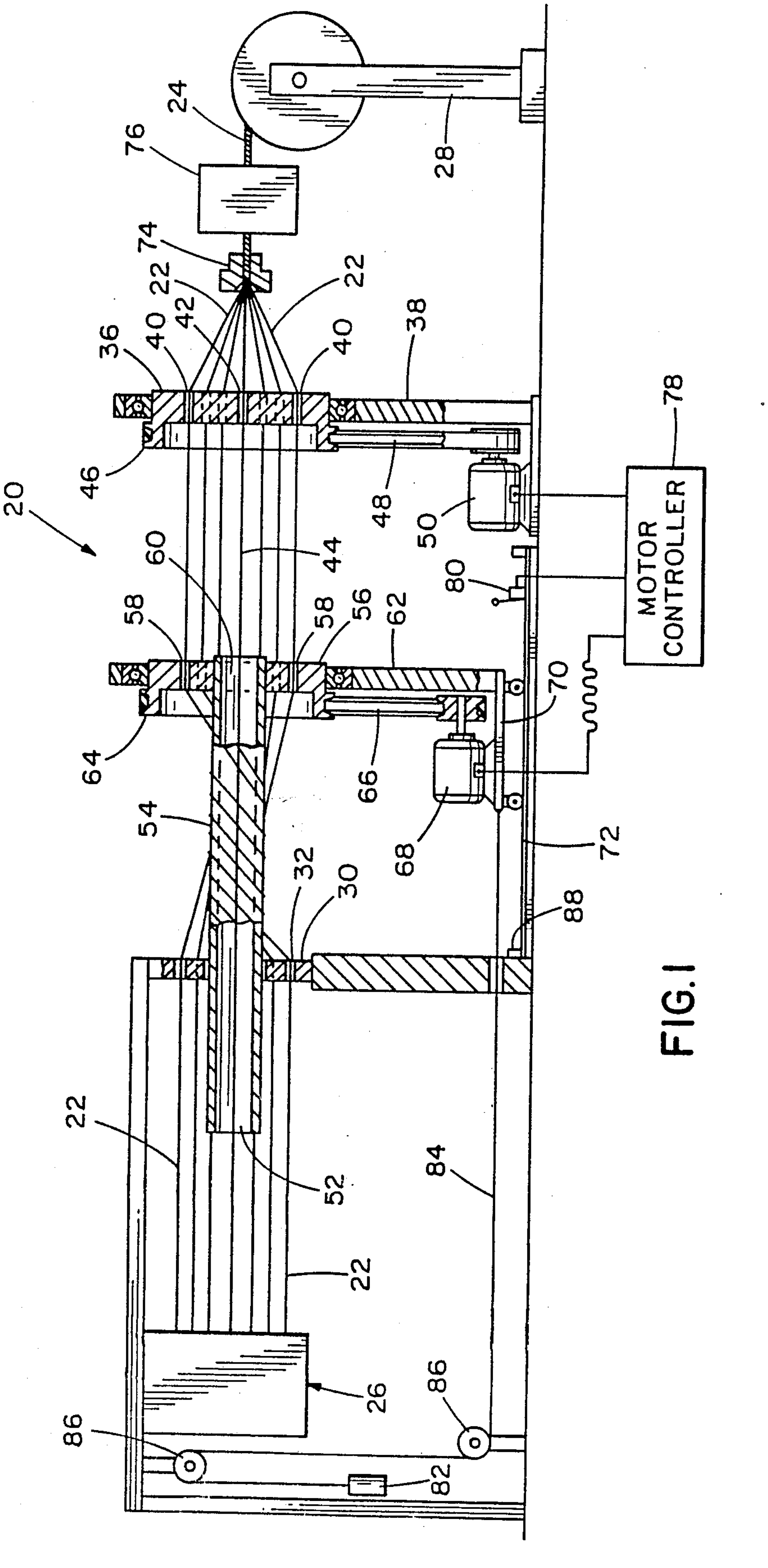
FIG. 1 is a simplified front elevational representation, partially in block form and with certain components shown in section, of SZ cabler apparatus embodying various aspects of the present invention including an upstream guide ring, a downstream guide ring, and an axially movable accumulator tube holding an intermediate guide ring.

Referring now to the drawings, in-line apparatus for forming several conductors 22 into a cable 24 having an SZ twist is generally indicated by reference numeral 20. The conductors 22 can be either electrical (having a metallic core) or optical fiber (having a glass or plastic core), or both optical and electrical conductors can be combined into the cable 24. In any event, each conductor has a protective outer jacket of plastic or rubber. The apparatus 20 includes at its upstream end supply means 26 for providing the several conductors. The supply means is preferably formed by a number of supply reels of the conductors, with each reel being mounted for rotation about its axis to pay out its conductor. As the reels are supplying an SZ cabler, there is no need to rotate the reels about the axis of cable, as would be required if the cable were formed of conductors continuously wound in the same direction. Because the supply reels are not rotated about one another, much larger reels can be used than the ones employed in a planetary cabler. This significantly increases production running time before the supply reels become exhausted and require replacement. At the downstream end of the cabler apparatus is provided take-up means 28 for advancing the conductors 22 through or past other components of the apparatus 20 and for taking up the completed cable 24. The take-up means preferably comprises a driven reel, as is well known to those of skill in the art.

Figure 4:
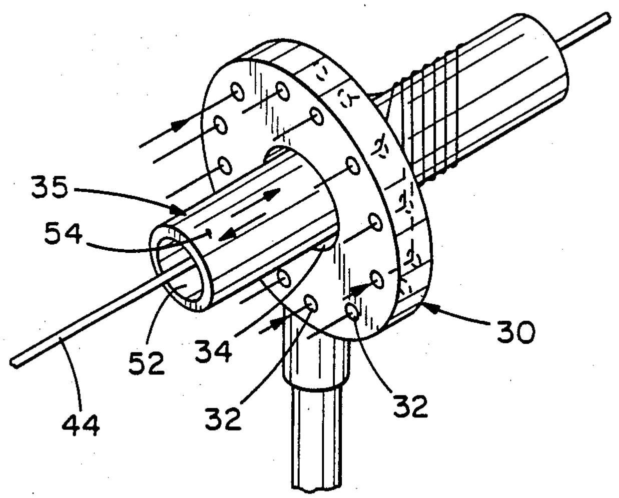
FIG. 4 is a perspective view showing the accumulator tube extending through a central aperture in the upstream guide ring.

Also included in the cabler apparatus 20 is a fixed guide ring 30 (best shown in FIG. 4) which is held by supporting structure against rotation and against axial movement. The guide ring 30 has a plurality of openings 32 which are regularly spaced and disposed adjacent the ring periphery. Each opening 32 permits passage of one of the conductors 22. The ring 30 also has a central aperture 34 for slidably receiving an accumulator tube 35. The guide 30 is positioned adjacent to and downstream of the conductor supply 26 with the various conductors extending substantially straight between the supply and the guide ring 30.

Positioned downstream of ring 30 is a guide ring 36 rotatably held by a pillow block 38 which holds the ring from movement in the direction of travel of the conductors. The ring 36 also has a plurality of regularly spaced openings 40 for passage of the conductors 22 and has a central aperture 42 permitting passage of an optional central strength member 44 of the cable 24. The ring 36 has a grooved rim 46 for receiving an endless belt 48 driven by a first motor 50.

Figure 2:
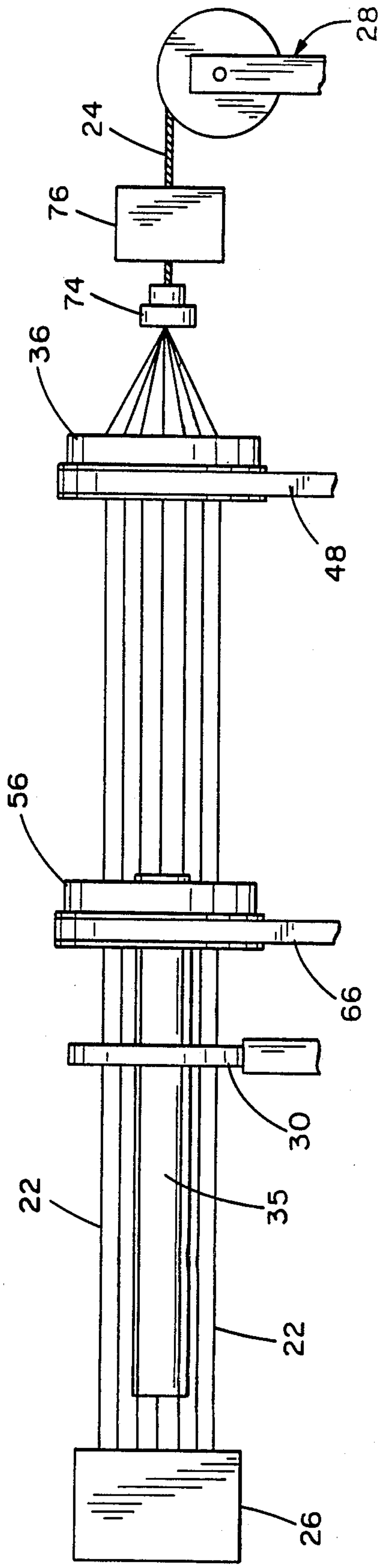
FIG. 2, similar to FIG. 1, but with certain components removed, illustrates the accumulator tube in its upstream position.
Figure 3:
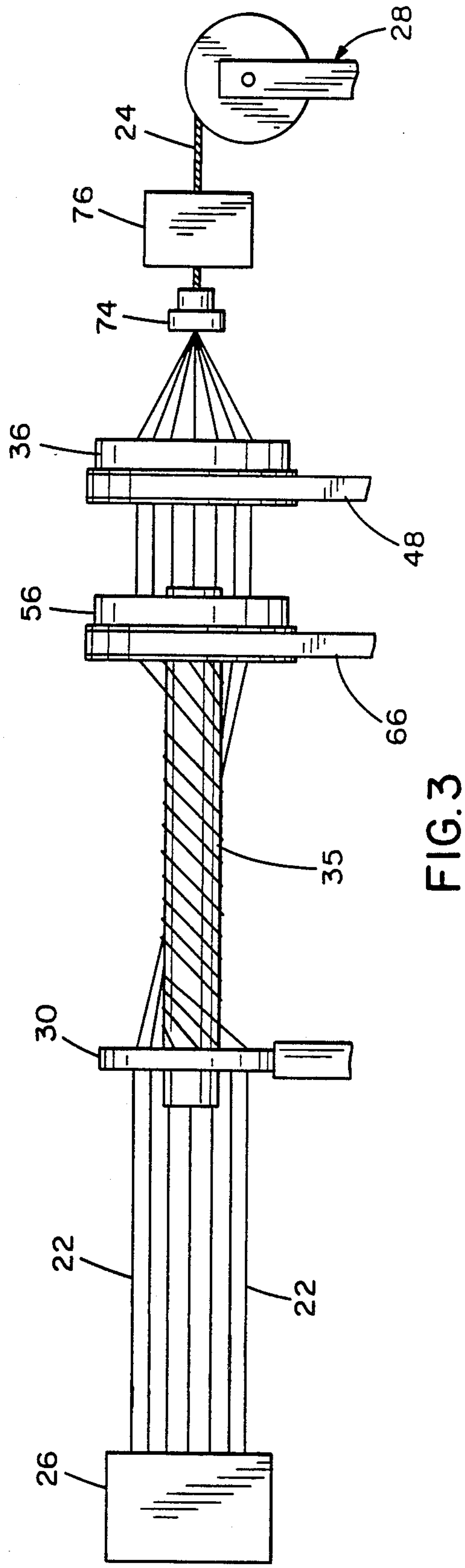
FIG. 3, similar to FIG. 2, shows the accumulator tube, in its downstream position.
Figure 5:
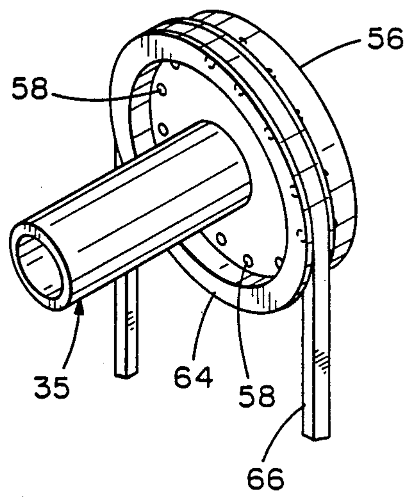
FIG. 5 is a perspective view depicting the intermediate guide ring fixedly held at the downstream end of the accumulator.

The accumulator tube 35 may be provided with a central bore 52 receiving the strength member 44, and has an outside surface 54 for accumulating turns of the conductors. Some of the cable constructions which can be made with the cabler apparatus 20 do not require the presence of the strength member. The tube carries adjacent its downstream end an intermediate guide ring 56, as best shown in FIG. 5, also having openings 58 for passage of the conductors and a central aperture 60 for the strength member 44. The ring 56 is mounted for rotation by means of a pillow block 62, and has grooved rim 64 receiving an endless belt 66 driven by a second motor 68. The block 62 and motor 68 are mounted on a carriage 70, the movement of which is guided by rail means 72 extending in the direction of travel of the conductors. Thus the accumulator tube 35 and intermediate ring 56 are rotatable by means of the second motor 68, while the tube and ring 56 can be reciprocated relative to the direction of travel of the conductors 22, between an upstream position (shown in FIG. 2) and a downstream position (shown in FIG. 3), because of their mounting on the carriage 70.

Positioned between the downstream guide ring 36 and the take-up reel 28 is a closing die 74 for bringing the various twisted conductors together to form the cable 24. The closing die is immediately followed downstream by a binding station 76 which applies a spiral wrap or an outer jacket to the cabled conductors to hold the various conductors in their twisted configuration. Such binding stations are well known to those of skill in the art and need not be further discussed here.

The motors 50 and 68 are controlled by a motor controller 78 which drives both motors in the same direction. The motors are of the non-slip type, and may be stepping motors, so that the guide rings 36 and 56 rotate the same number of turns and at the same speed before being reversed. Thus, the conductor portions extending between the guide rings 36 and 56 are substantially parallel and the turns caused by rotation of the guide ring 56 and tube 35 are reflected between the guide 36 and the closing die 74, which, while permitting passage of the twisted conductors, does compress them together sufficiently to prevent their substantial untwisting.

Positioned at least halfway downstream between the fixed guide ring 30 and the downstream guide ring 36 is a limit switch 80 which is actuated by downstream passage of the intermediate guide ring 56. The switch 80 is connected to the motor controller 78 which in response to the actuation of the switch concurrently reverses the direction of rotation of both motors. The apparatus 20 further includes means for biasing the accumulator tube 35 to its upstream position. As shown in FIG. 1, this biasing means may be a weight 82 connected to the rear end of the carriage 70 by a cord 84 which passes over pulleys 86. Preferably the biasing means applies constant force and also may take the form of a third motor connected to the carriage through a slip clutch. The biasing means could also include a constant force spring. Additionally, the biasing force can be provided by elevating the rail means 72 so that the force of gravity effectively biases the tube 35 to its upstream position, in which the carriage 70 engages a stop 88. It will be appreciated that the biasing force is weaker than the force applied by the driven take-up reel 28.

Operation of the SZ cabler apparatus 20 of the present invention is as follows. After the various conductors 22 from the supply spools 26 are threaded through the various openings in the fixed guide ring 30, the intermediate guide ring 56 and the downstream guide ring 36, they are passed through the closing guide and onto the take-up reel 28. With the accumulator tube 35 in its upstream position, shown in FIG. 2, under the bias of the weight 82, the controller 78 is actuated to start motors 50 and 68 rotating at the same speed in the same direction. As the intermediate ring 56 rotates and the fixed guide ring 30 does not, turns of the conductors 22 start to accumulate on the tube 35. Initially the tube 35 does not move from its upstream position because the biasing means provides greater force than the relatively slight frictional forces applied on the outside surface of the tube by the jackets of the conductors 22. However, with time, sufficient turns of the conductors accumulate on the tube that the conductors effectively "lock on" to the outside surface of the tube thereby advancing the carriage 70 downstream due to the force applied by the take-up reel 28.

As the accumulator tube continues to take on more conductor turns and moves downstream, the limit switch 80 is actuated. This causes reverse rotation of both motors which starts to take turns off of the tube. However, the tube continues to move downstream because the frictional forces occasioned by the turns are still sufficient to overcome the operation of the biasing return weight 82. As the tube continues to move downstream, sufficient turns will have been removed from the tube 35 so that there is an effective balancing of forces causing the tube to stagger and start to slip with respect to the advancing conductors. Thus, the tube will have reached its downstream position shown in FIG. 3. With the continuing removal of turns, the biasing forces overcome the frictional forces and the accumulator tube falls back toward its upstream position under the influence of the return weight 82. The tube 35, intermediate ring 56 and downstream ring 36 continue to rotate in the same direction which now causes an accumulation of turns in the opposite or Z direction on the tube. After a time these turns build sufficiently so that the conductors again lock on to the tube resulting in the take-up reel pulling the accumulator tube downstream until such time as the limit switch is again actuated causing the motors to again reverse and the removal of turns from the tube. Thus, the cycle of operation continues with the motors reversing each time the accumulator tube moves downstream to actuate the limit switch. The closing die presses together the twisted conductors 22 and the binding station 76 applies an outer jacket or wrap to maintain the conductors in their twisted conditions thereby completing formation of the cable 24.

As a method of forming a plurality of conductors 22 into a cable 24 having an SZ twist, the invention includes several steps:

(a) The conductors are advanced from the supply spools 26 to the take up reel 28.

(b) The conductors are passed through openings in the fixed guide ring 30, the rotatable downstream guide ring 36 and the intermediate guide ring 56, the intermediate guide ring being held adjacent the downstream end of the accumulator tube 35.

(c) The tube 35 is biased towards its upstream position with the biasing force being weaker than the force applied by the take-up reel to advance the conductors.

(d) The rotatable guide ring 36 is rotated using a first motor 50 and the intermediate guide ring 56 is rotated in the same direction with a second motor 68 until the frictional forces imposed by the increasing number of turns of the conductors on the tube causes the tube to advance to a predetermined location at least halfway between the upstream location and the downstream location.

(e) The direction of rotation of both motors is reversed upon the tube 35 reaching the predetermined location and that reversed direction of rotation is maintained until the tube moves to its upstream position under the influence of the biasing means and, upon accumulating more turns, again moves downstream to the predetermined location; and (f) The reversing of rotation of both motors is continued each time the tube moves downstream to the predetermined location.

By way of example, the line speed of the take-up reel 28 may be about 100 ft./min. The accumulator tube could be 10 to 12 feet in length and would accumulate about one twist of each conductor per linear foot of tube.

One advantage of providing separate motors for downstream guide ring 36 and intermediate guide ring 56 is that the guide rings can be operated at different speeds. While the number of revolutions of each motor in each direction during one cycle of operation should be substantially equal to prevent accumulation of turns over a number of cycles, selective variations of the motor speeds can result in the use of higher speed for the take-up reel. For example, assume that downstream motor 68 is operated at constant speed and that the upstream motor 50 which drives the accumulator tube 35 is run at a faster rate initially to quickly buildup turns on the tube and between the rings 56 and 36. Upon the tube moving downstream to where the limit switch 80 is actuated, both motors reverse but with motor 68 again running faster to take off enough turns for the tube to return toward its upstream position under the influence of the return weight 82. The motor 68 is then operated to run slower than motor 50 so that turns are still being removed from between rings 36 and 56 as the tube returns toward its upstream position. The net result is that the accumulator tube moves between its positions faster than using constant motor speeds. The disadvantages of the method using variable speed of the motor 68 are that the twists must be counted and the controller would be more complicated.

Figure 6:
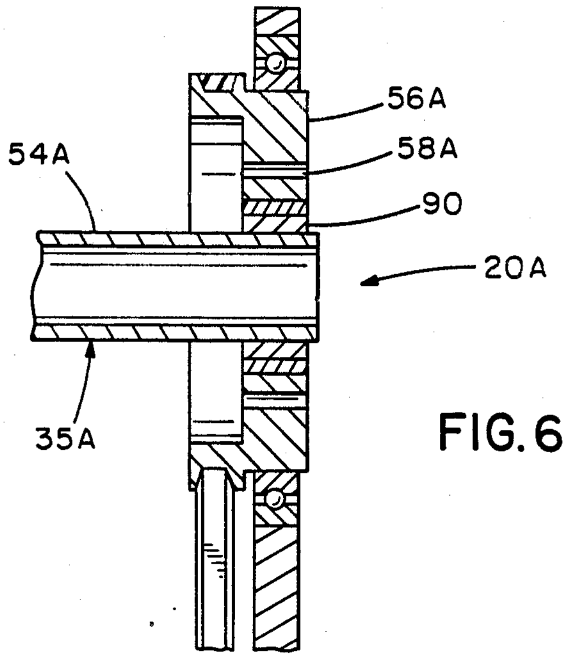
FIG. 6 is a cross-sectional view of an alternative embodiment in which a slip clutch is employed between the intermediate guide ring and the accumulator tube.

Referring to FIG. 6, a portion of an alternative embodiment 20A of the SZ cabler apparatus is shown. Components of apparatus 20A corresponding to components of apparatus 20 are indicated by the reference numeral applied to the component of apparatus 20 with the addition of the suffix "A". The cabler apparatus 20A is similar to apparatus 20 except that, rather than being fixed to the downstream end of the accumulator tube 35A, the intermediate guide ring 56A is connected to the tube through a slip clutch 90. The use of the slip clutch for transmitting power from the guide ring 56A to the tube 35A decreases the inertia that must be overcome to reverse directions resulting in a shorter transition portion between adjacent S and Z twisted portions in the cable 24. That is, when the direction of the second motor 68A is reversed, the guide ring 56A reverses direction before the tube 35A resulting in turns being taken off the downstream part of the tube immediately. Although there is some slippage between the tube 35A and the ring 56A, with time, the direction of rotation of the tube also reverses and the ring 56A and tube 35A start to rotate in unison.

The unwrapping of the conductors from the front of the tube permits the use of a shorter tube than otherwise would be required. As the conductor turns are unwound from the front of the tube, the tube stops moving forward sooner because the conductors slide through the openings 58A in the ring 56A instead of being in frictional engagement with the outside surface 54A of the tube 35A.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for forming several conductors into a cable having an SZ twist, said apparatus comprising:

supply means for supplying a plurality of conductors to be formed into said cable disposed at the upstream end of said apparatus, take-up means for advancing said conductors downstream and for taking up the completed cable positioned at the downstream end of said apparatus;

a fixed guide means having openings for passage of said conductors disposed downstream of said supply means, said conductors extending substantially straight between said supply means and said fixed guide means;

a rotatable guide means disposed downstream of said fixed guide means and having openings for passage of said conductors, said rotatable guide means being held from movement relative to the direction of travel of said conductors;

first motor means for rotating said rotatable guide means;

an accumulator tube having an outside surface for accumulating turns of said conductors, said tube being reciprocal relative to the direction of travel of conductors;

an intermediate rotatable guide means disposed between the aforementioned two guide means, carried by said tube adjacent its downstream end and having openings for passage of said conductors;

second motor means, distinct from said first motor means, for rotating said intermediate guide means and said tube, said tube being movable between a downstream position wherein said intermediate guide means is disposed adjacent said rotatable guide means and an upstream position wherein said intermediate guide means is located closer to said fixed guide means; and means for biasing said accumulator tube towards its upstream position whereby rotation of said tube and said rotatable guide means in the same direction with said tube in its upstream position causes the accumulation of turns of conductors on said tube resulting in the frictional forces imposed on said tube by said turns overcoming the force applied by said biasing means so that said tube moves downstream, reversal of the direction of rotation of said tube and rotatable guide means resulting in the removal of turns from said tube so that with time the biasing force overcomes the frictional force causing the tube to return towards its upstream position.

2. Apparatus as set forth in claim 1 further comprising limit switch means disposed at a predetermined position between said fixed guide means and said rotating guide means, said limit switch means being actuated in response to passage of a predetermined location by said intermediate guide means, actuation of said switch means causing reversal of the direction of rotation of said first motor means and of said second motor means.

3. Apparatus as set forth in claim 2 wherein said predetermined position is greater than halfway the distance between said fixed guide means and said rotating guide means.

4. Apparatus as set forth in claim 1 wherein said biasing means comprises means for applying a substantially constant force against the movement of said tube toward said downstream position.

5. Apparatus as set forth in claim 4 wherein said means for applying force includes a constant force spring.

6. Apparatus as set forth in claim 4 wherein said means for applying force includes a slip clutch.

7. Apparatus as set forth in claim 4 wherein said means for applying force includes a return weight.

8. Apparatus as set forth in claim 1 further comprising a slip clutch disposed between said accumulator tube and said intermediate guide means, said second motor means driving said intermediate guide means whereby operation of said clutch to permit slippage permits faster reversal of said intermediate guide means.

9. Apparatus as set forth in claim 1 wherein said fixed guide ring has a central aperture slidably receiving said accumulator tube.

10. Apparatus as set forth in claim 1 wherein each of said fixed guide means, said rotatable guide means and said intermediate guide means comprises a guide ring having a plurality of regularly spaced openings adjacent its periphery for receiving said conductors, there being a separate opening for each conductor.

11. Apparatus as set forth in claim 10 wherein said cable includes a central member and wherein each said guide ring and said tube has a central aperture for passage of said central member.

12. Apparatus for forming a plurality of conductors into a cable having an SZ twist, said apparatus comprising:

supply means for supplying said plurality of conductors and disposed at the upstream end of said apparatus;

take-up means for advancing said conductors downstream and for taking up the completed cable, said take-up means being positioned at the downstream end of said apparatus;

a fixed guide ring having openings for passage of said conductors and located downstream of said supply means, said conductors extending substantially straight between said supply means and said fixed guide ring;

a rotatable guide ring disposed downstream of said fixed guide means and having a different opening for passage of each of said conductors, said rotatable guide means being held from movement in the direction of travel of said conductors;

a first motor for rotating said rotatable guide ring by means of an endless belt;

an accumulator tube having an outside surface for accumulating turns of said conductors, said tube being movable between an upstream position and a downstream position;

an intermediate rotatable guide ring disposed between the two aforementioned guide rings and carried by said tube adjacent its downstream end and having a separate opening for each conductor;

a second motor for rotating said intermediate guide ring and said tube by means of an endless belt, said second motor rotating said intermediate guide ring in the same direction said first motor rotates said rotatable guide ring;

rail means extending substantially in the direction of travel of said conductors;

a carriage mounted for reciprocal movement on said rail means, said carriage supporting said second motor, said tube and said intermediate guide ring;

a limit switch positioned for actuation as said carriage moves downstream, actuation of said switch causing reversal of rotation of said motors; and means for biasing said accumulator tube towards its upstream position whereby rotation of said motors in one direction causes an increasing number of turns to accumulate on said tube resulting into the frictional forces applied by said turns overcoming the biasing force so that said tube moves downstream, the actuation of said switch causing removal of turns from said tube so that said biasing means can return said tube towards its upstream position.

13. A method of forming a plurality of conductors into a cable having an SZ twist, said method comprising the following steps:

advancing said plurality of conductors from an upstream conductor supply means to a downstream cable take-up means;

passing said conductors through openings in a fixed guide ring disposed adjacent said supply means, a rotatable guide ring positioned adjacent said take-up means and an intermediate rotatable guide ring located between the other two guide rings, said intermediate guide ring being held adjacent the downstream end of an accumulator tube having an outside surface for accumulating turns of said conductors, said accumulator tube being able to be reciprocated in the direction of travel of said conductors between an upstream position and a downstream position;

biasing said tube towards its upstream position, the biasing force being weaker than the force advancing said conductors;

rotating said rotatable guide ring with a first motor and rotating said intermediate guide ring and said tube in the same direction with a second motor until the frictional forces imposed by the increasing number of turns on the tube cause the tube to advance to a predetermined location at least halfway between said upstream location and said downstream location;

reversing the direction of rotation of both motors upon said tube reaching said predetermined location, and maintaining that direction of rotation until said tube moves to its upstream position and again moves downstream to said predetermined location; and continuing reversing the direction of both motors each time said tube moves downstream to said predetermined location.

* * * * *

UNITED STATES PATENT AND TRADEMARK OFFICE

CERTIFICATE OF CORRECTION

PATENT NO. : 4,813,223

DATED : March 21, 1989

INVENTOR(S) : James H. Nipper et al.

It is certified that error appears in the above-identified patent and that said Letters Patent is hereby corrected as shown below:

Column 2, line 6, after "cycle" insert --of operation. In the--.

Column 2, line 7, after "present" delete "of operation. In the".

Column 2, line 7, delete spaces before "apparatus".

Column 4, line 29, after "has" insert --a--.

Signed and Sealed this

Thirtieth Day of January, 1990

*Attest:*

JEFFREY M. SAMUELS

*Attesting Officer* *Acting Commissioner of Patents and Trademarks*